(12) United States Patent
Gehrett et al.

(10) Patent No.: US 7,721,996 B2
(45) Date of Patent: May 25, 2010

(54) FABRICATION AND INSTALLATION OF PREFORMED DIELECTRIC INSERTS FOR LIGHTNING STRIKE PROTECTION

(75) Inventors: Kathryn Louise Gehrett, Seattle, WA (US); James Francis Kirchner, Renton, WA (US); Kelly Lee Clark, Seattle, WA (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 11/939,053

(22) Filed: Nov. 13, 2007

(65) Prior Publication Data

US 2009/0123745 A1  May 14, 2009

(51) Int. Cl.
*B32B 7/00* (2006.01)
*B32B 7/12* (2006.01)
*B64C 1/00* (2006.01)
*B64C 1/12* (2006.01)
*F16B 11/00* (2006.01)

(52) U.S. Cl. .................... 244/132; 244/117; 244/129.1; 403/7; 403/269; 411/377; 428/41.7; 428/343; 428/354

(58) Field of Classification Search ............... 428/354, 428/343, 41.7; 403/7, 269; 411/377; 244/117, 244/129.1, 132
See application file for complete search history.

(56) References Cited

U.S. PATENT DOCUMENTS

| | | | |
|---|---|---|---|
| 4,502,092 A | | 2/1985 | Bannink, Jr. et al. |
| 4,630,168 A | | 12/1986 | Hunt |
| 4,755,904 A | | 7/1988 | Brick |
| 4,789,918 A | | 12/1988 | Bannink et al. |
| 4,884,929 A | | 12/1989 | Smith et al. |
| 4,891,732 A | | 1/1990 | Jones |
| 4,979,281 A | | 12/1990 | Smith et al. |
| 5,391,028 A | * | 2/1995 | Charles ............... 411/374 |
| 5,499,782 A | | 3/1996 | Domine |
| 6,315,485 B1 | * | 11/2001 | Speck et al. .......... 403/7 |
| 2002/0119028 A1 | * | 8/2002 | Brown et al. ......... 411/372.5 |
| 2005/0144874 A1 | * | 7/2005 | West et al. ............ 52/459 |
| 2007/0041143 A1 | | 2/2007 | Georgeson et al. |
| 2007/0177330 A1 | | 8/2007 | Ackerman et al. |
| 2007/0258182 A1 | | 11/2007 | Morrill et al. |

* cited by examiner

*Primary Examiner*—Brent T O'Hern
(74) *Attorney, Agent, or Firm*—Armstrong Teasdale LLP

(57) ABSTRACT

A fabrication method for providing a relatively smooth surface associated with lightning strike protection for composite materials joined with fasteners recessed below the surface is described. The method includes coating at least one of a head of the fastener and a preformed dielectric insert with an adhesive, inserting the preformed dielectric insert into the recess such that the adhesive engages both contours of the recess and the preformed dielectric insert, and removing any excess adhesive from the surface area of the composite material and a top surface of the insert.

7 Claims, 9 Drawing Sheets

FABRICATION AND INSTALLATION OF PREFORMED DIELECTRIC INSERTS FOR LIGHTNING STRIKE PROTECTION

BACKGROUND OF THE INVENTION

This invention relates generally to lightning strike protection, and more specifically, to fabrication and installation of preformed dielectric inserts.

There are thousands of recessed fasteners in a typical aircraft surface. In one aircraft wing example, these fasteners penetrate from the skin exterior and extend into the fuel tank. One currently contemplated fabrication plan is application of an uncured sealant over the fasteners as part of an integrated lightning strike protection system. The sealant is cured in place, then shaved with a cutter to flushness with the surrounding wing skin. In composite aircraft structures, the sealant functions as a dielectric insulating layer, insulating the fasteners from lightning strikes.

Mechanical devices with reciprocating metal blades are known, and utilized to shave an upper portion of a cured in place dielectric sealant material such that it is substantially flush with a surface. However, these devices cannot be utilized in certain production environments. In one example, the number of places to be shaved in a given area may preclude use of the mechanical device. In another example, the surface where the sealant has been placed may be contoured, which also may not be easily compatible with the described shaving process.

The above described process is labor intensive, and the in-place curing and shaving of dielectric sealant may effect aerodynamic dimensional tolerances. Another issue is that sealant application is an integral step in the assembly process rather than prior to or concurrent with the assembly process (i.e., more labor, time, and interference with other production steps). Accordingly, there is continued effort in the art for improvement in regard to installation of dielectric materials in certain applications.

BRIEF DESCRIPTION OF THE INVENTION

In one aspect, a fabrication method for providing a relatively smooth surface, the smooth surface associated with lightning strike protection for composite materials joined with fasteners recessed below the surface is provided. The method includes coating at least one of a head of the fastener and a preformed dielectric insert with an adhesive, inserting the preformed dielectric insert into the recess such that the adhesive engages both contours of the recess and the preformed dielectric insert, and removing any excess adhesive from the surface area of the composite material and a top surface of the insert.

In another aspect, a structure is provided that comprises a first mechanical member comprising a surface having at least one bore therein, at least one fastener configured to attach the first mechanical member to a second mechanical member, the fastener configured for insertion into the bore, an area between a top surface of the fastener and the surface of said first mechanical member defining a recess, a preformed insert having substantially complimentary dimensions to the recess, and an adhesive. The adhesive is applied to at least one of the fastener and the preformed insert which is inserted into the recess such that the adhesive engages both the recess and the insert.

In still another aspect an assembly is provided that is associated with lightning strike protection for joined composite materials, where the composite materials are joined with fasteners recessed below the surface of the composite materials. The assembly comprises a preformed dielectric insert comprising at least one layer of dielectric material and a top surface configured to be substantially planar with the surface of the composite materials, and an adhesive. The preformed dielectric insert is configured for insertion into a recess associated with one of the fasteners and has a shape complimentary to the recess. The adhesive is configured to cause the preformed dielectric insert to adhere to the recess.

DETAILED DESCRIPTION OF THE INVENTION

The methods and apparatus described herein are related to a preformed dielectric insert that is applied over recessed fasteners, such as those utilized in aircraft fuselage and wing fabrication. Utilization of the preformed dielectric inserts, rather than cured in place sealant, reduce installation and inspection time, waste, chances of damaging the aircraft surface material, for example, composite material. The preformed dielectric inserts also increase precision in meeting dimensional tolerances to provide better lightning strike protection. By covering fasteners utilized in aircraft and aircraft wing fabrication, essentially burying the fasteners under dielectric material, it is thought that lightning will tend to be attracted to areas that are better configured to dissipate the electrical charge that is present in a lightning strike.

Figure 1A:
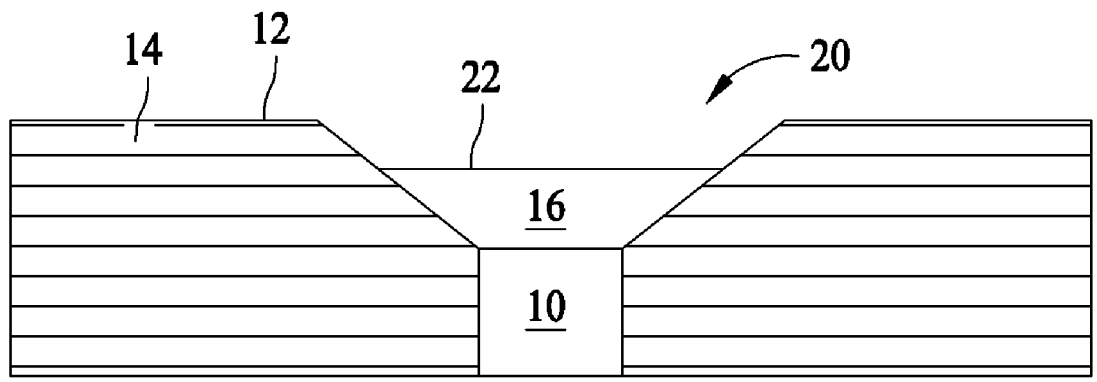
FIGS. 1A and 1B are side and top views respectively of a recessed fastener with respect to a top surface of the item being fastened.
Figure 1B:
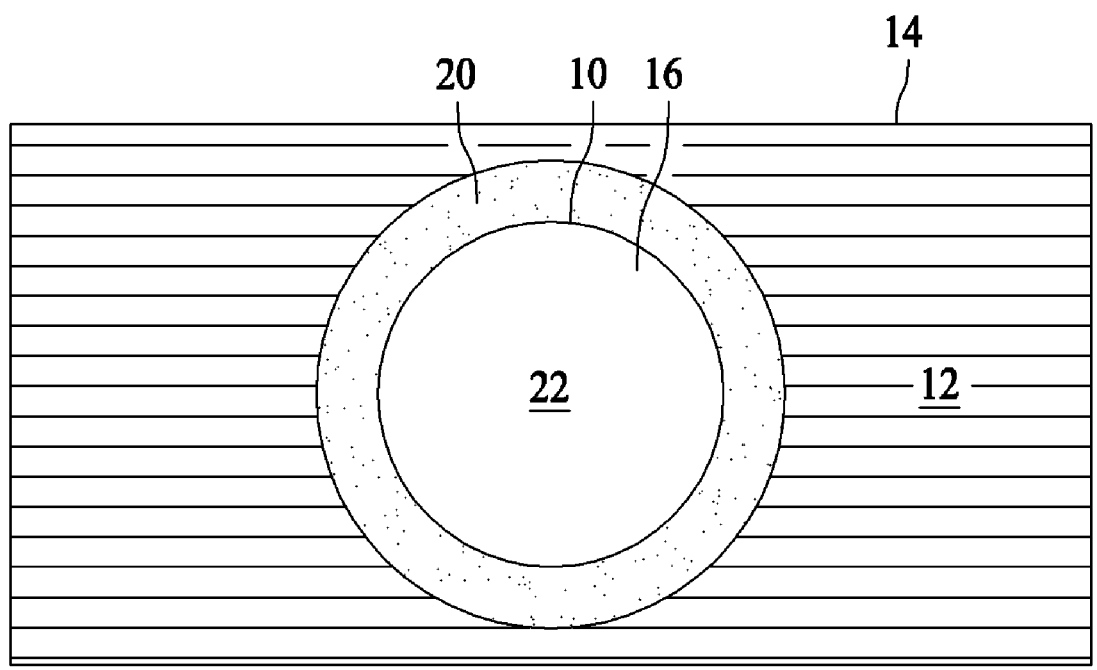

FIGS. 1A and 1B are side and top views respectively of a recessed fastener 10 with respect to a top surface 12 of the item 14 being fastened. Item 14, in a particular application, is a portion of an airframe assembly, but is representative of any item that might be utilized in conjunction with one or more recessed fasteners 10. In a particular embodiment, fastener 10 has a top portion 16 that is configured to engage a complimentary shaped portion of a bore 20 in the item 14, causing at least a part of the engagement between the fastener 10 and item 14. Top portion 16 of fastener 10 includes a fastener top surface 22. In FIG. 1, the portion of bore 20 and the top portion 16 of fastener 10 are both frusta-conical in shape, but other geometries for fasteners and bores are known. In various embodiments, fastener 10 is a rivet, a bolt, screw, or other fastening device.

Figure 2A:
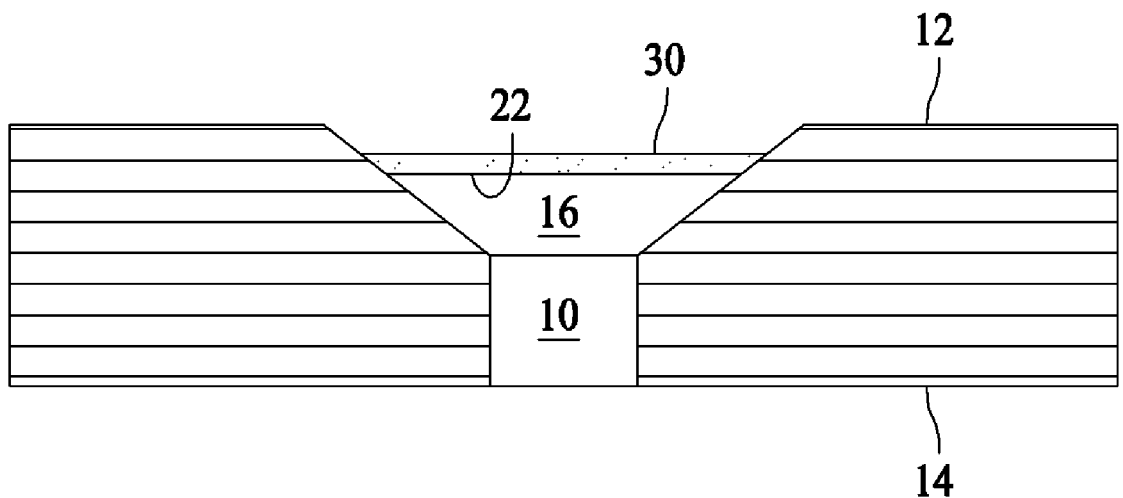
FIGS. 2A and 2B are side and top views respectively of the assembly of FIG. 1, with a layer of adhesive deposited on a top surface of the fastener.
Figure 2B:
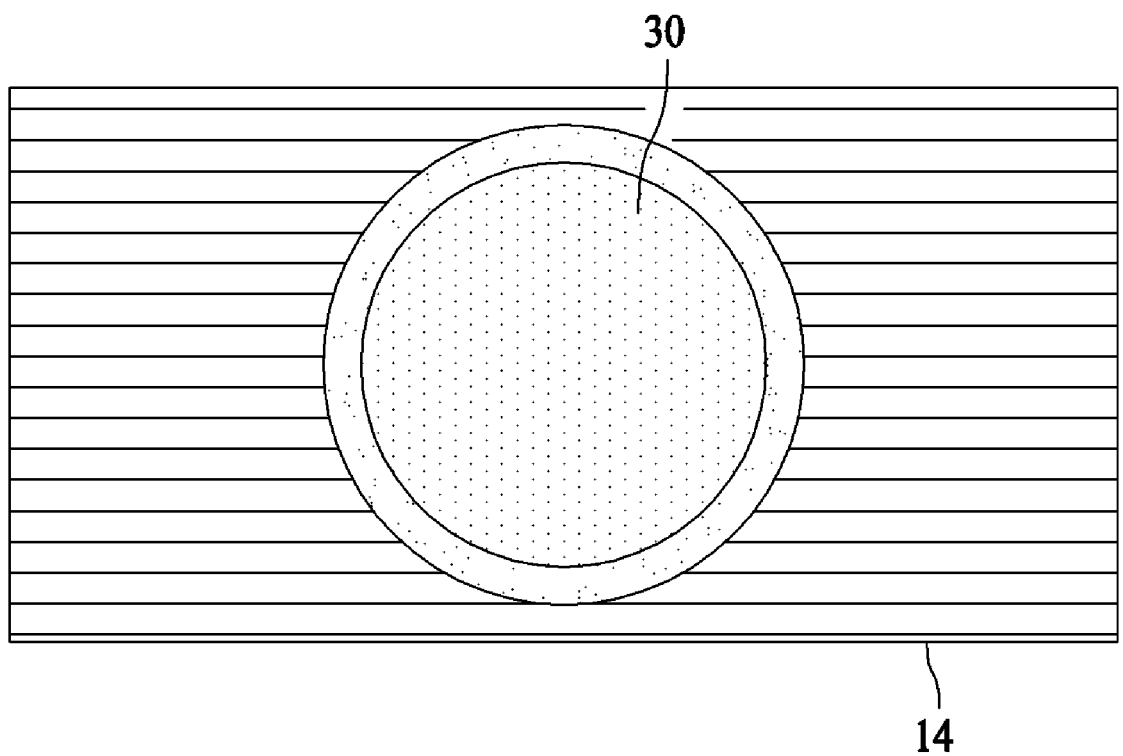

FIGS. 2A and 2B are side and top views respectively of the assembly of FIG. 1. A layer of adhesive 30 has been deposited on the top surface 22 of the fastener 10. In various embodiments, adhesive 30 is a thermoset, or thermoplastic elastomer, or a pressure sensitive adhesive. Examples of thermoset adhesives includes a polysulfide-based or a polythioether-based polymeric material based on polymer resin system. In a specific embodiment, the polysulfide has a backbone structure containing a $-(CH_2CH_2-O-CH_2-O-CH_2CH_2)-$ functionality where C, H, and O represent the presence of carbon, hydrogen, and oxygen atoms, respectively.

Figure 3A:
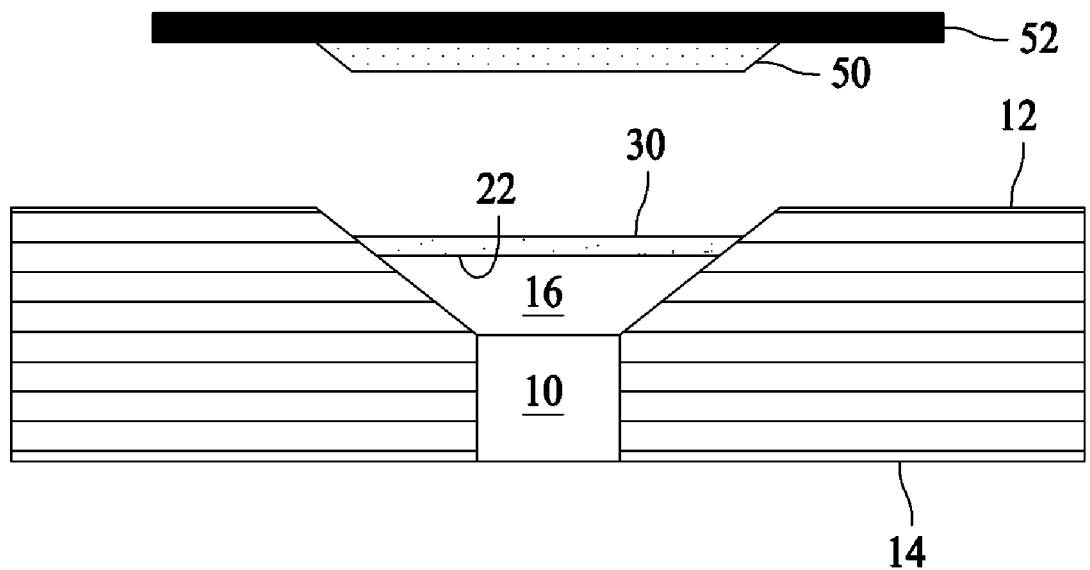
FIGS. 3A and 3B are side and top views respectively of a preformed dielectric insert with removable backing.
Figure 3B:
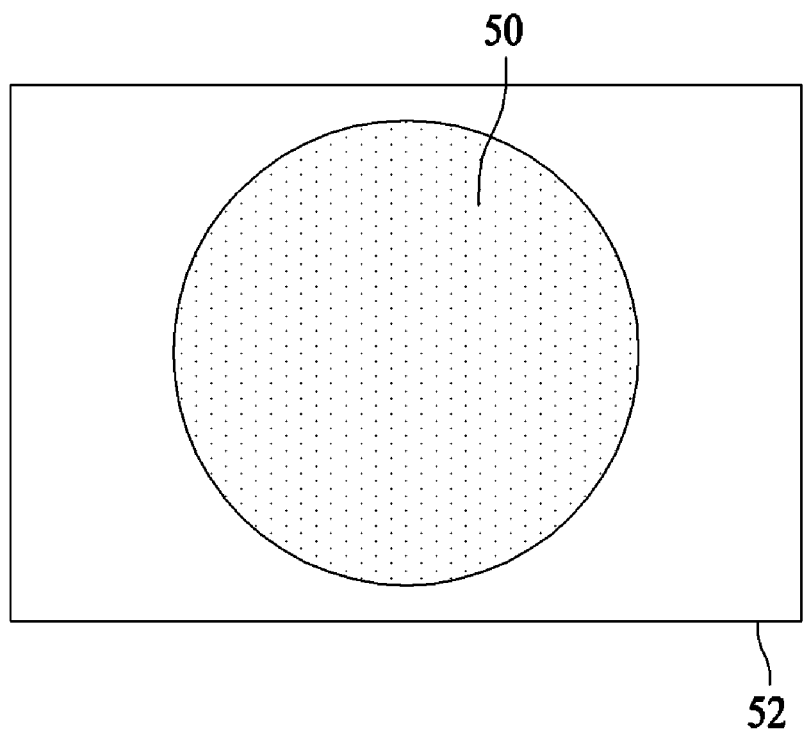

FIGS. 3A and 3B are side and top views respectively of an insert 50 and an optional removable backing material 52. In a particular embodiment, insert 50 is a preformed dielectric insert. In the side view of FIG. 3A, the insert 50 (and removable backing material 52) is shown in a position above the fastener 10 and adhesive 30 combination. As is evident from the illustration, insert 50 is formed to have a shape substantially complimentary to the portion of bore 20 that is not occupied by fastener 10. It should be noted that a thickness of adhesive 30 is dependent on the type of insert utilized. In the illustrated embodiment, insert 50 has a substantially frusta-conical shape though both the bore 20 and insert 50 could have other complimentary shapes. In particular embodiments, backing material is colored, or color coded, for identification. It is contemplated that color coding could be utilized to identify different dielectric insert configurations. Embodiments of inserts 50 that do not utilize a removable backing material are also contemplated. In any of the embodiments, the inserts 50 may be color coded as well.

The inserts 50 are described below as being fabricated from a moldable dielectric material. However, other embodiments are contemplated, including, but not limited to, ceramic materials and composite materials. In a specific embodiment, the insert 50 is fabricated from the same composite material as item 14.

Figure 4A:
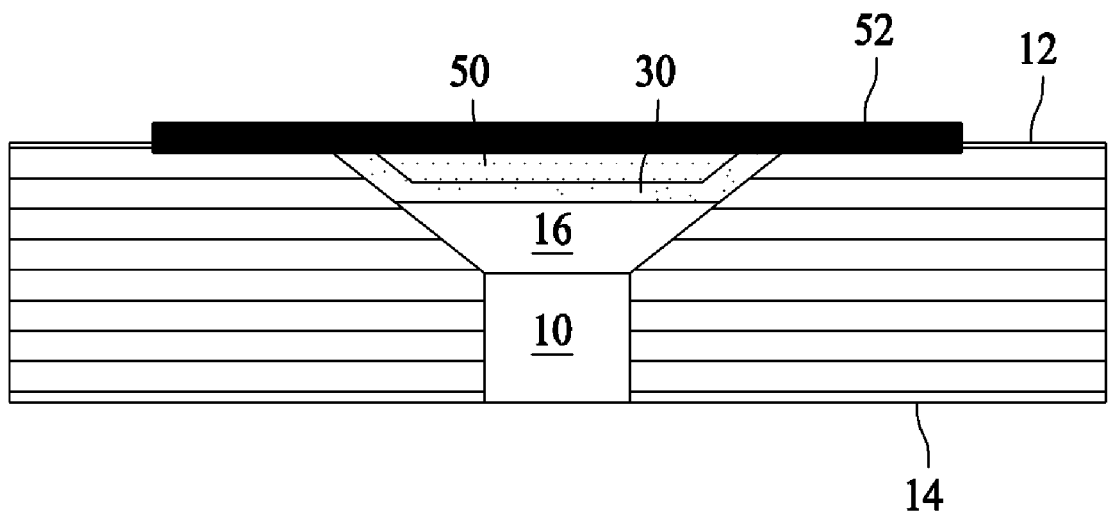
FIGS. 4A and 4B are side and top views respectively of the preformed dielectric insert inserted into the recess and contacting the adhesive shown in FIG. 2.
Figure 4B:
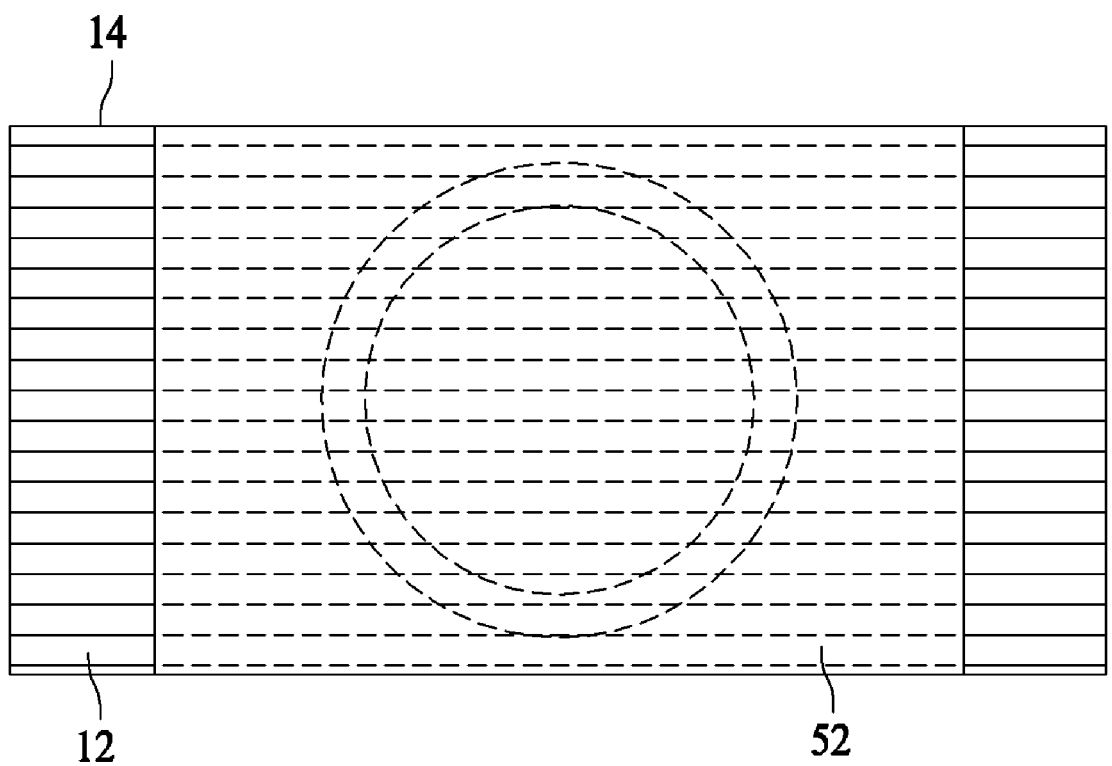

FIGS. 4A and 4B are side and top views respectively of the insert 50 inserted into the above described bore 20 and contacting the adhesive 30 described above with respect to FIG. 2. In one application, a user applies pressure to backing material 52 (or the insert 50 itself in embodiments that do not incorporate backing material 52), forcing insert 50 into the adhesive 30 and causing a portion of the adhesive 30 to be displaced. The adhesive 30 then surrounds the frusta-conical surface of the insert 50, and a portion of the adhesive 30 may escape and come into contact with the top surface 12 of the item 14 being fastened. FIG. 4 illustrates the displacement of a portion of adhesive 30.

Figure 5A:
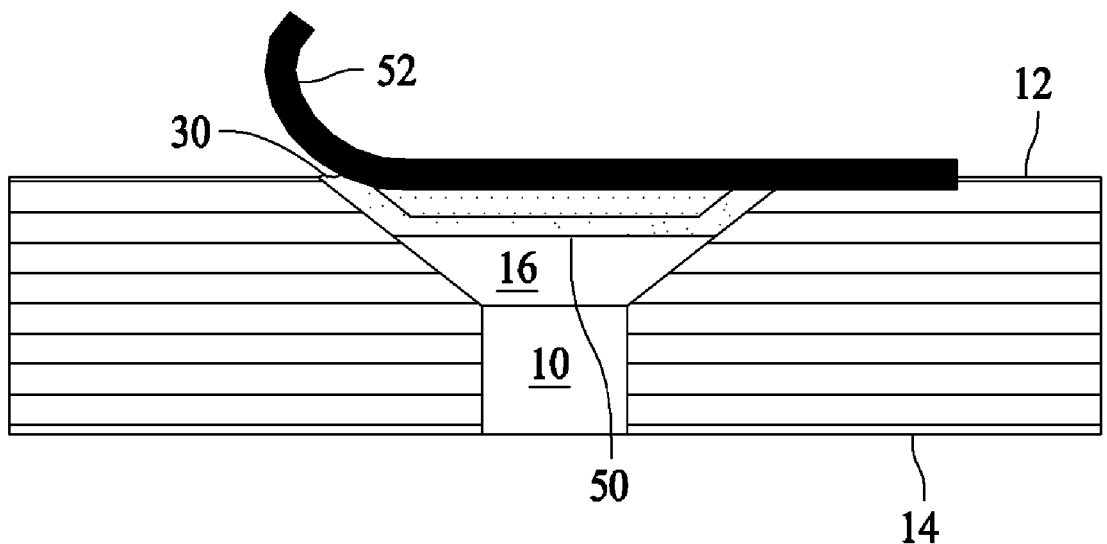
FIGS. 5A and 5B are side and top views respectively of the removable backing being removed from the preformed dielectric insert.
Figure 5B:
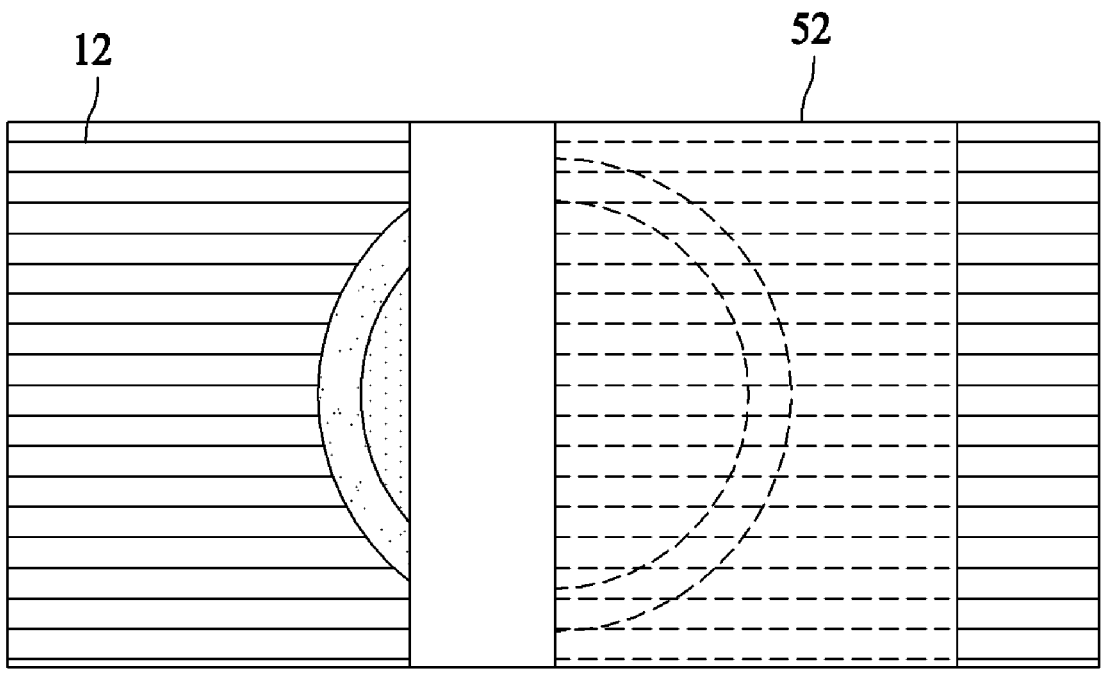

FIGS. 5A and 5B are side and top views respectively of the removable backing 52 being removed from the insert 50 illustrating that the removable backing 52, in one embodiment, is a peel off backing. The top surface 12 is wiped to remove excessive adhesive from a top area of the composite material and a top surface of the insert before the adhesive dries. In an alternative embodiment, removable backing 52 is attached to insert utilizing a pressure sensitive adhesive.

Figure 6A:
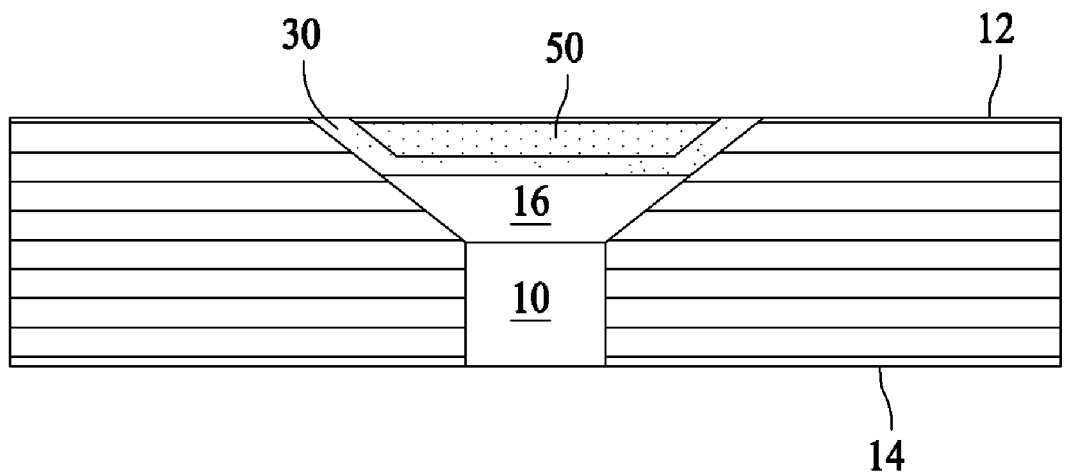
FIGS. 6A and 6B are side and top views respectively of the completed assembly including the fastener, adhesive, and preformed dielectric insert.
Figure 6B:
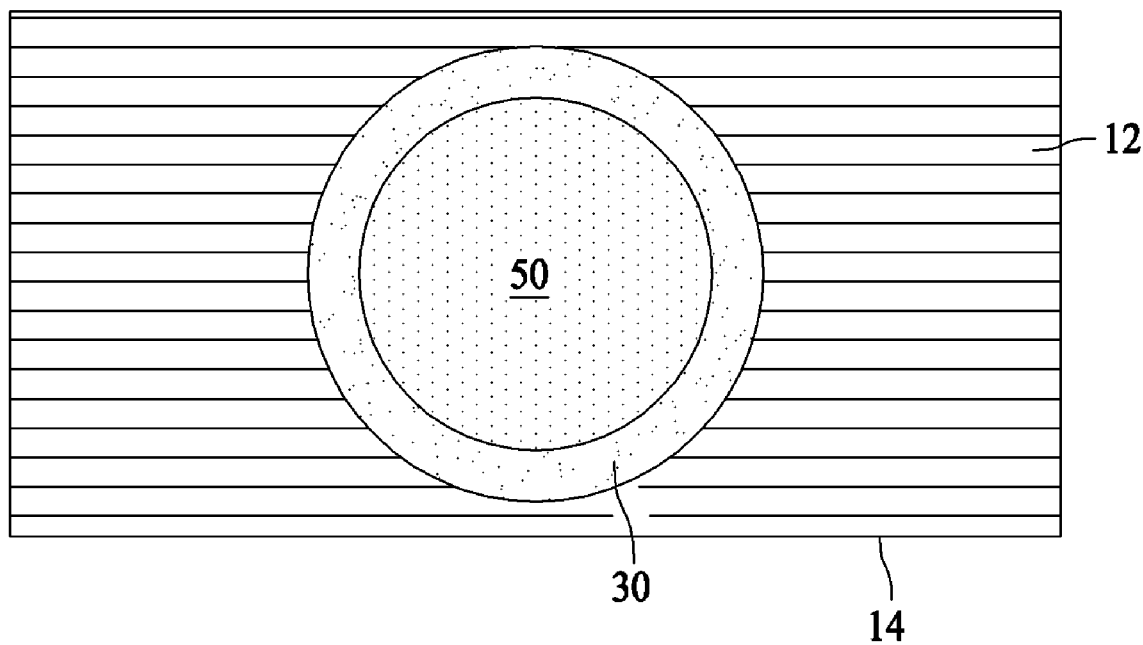

FIGS. 6A and 6B are side and top views respectively of the completed assembly including the fastener 10, adhesive 30, and insert 50, which as described above is a preformed dielectric insert, configured for lightning strike protection.

In an embodiment, insert 50 is fabricated from one or more dielectric materials, and may include single or multiple functional layers. More specifically, the insert 50 may include single or multiple functional layers that are fabricated from dielectric materials. In certain embodiments, insert 50 is fabricated from two or more laminar functional layers with different conductivities, and in specific embodiments, the different functional layers alternate one or more times. In these embodiments, at least one of the functional layers is a dielectric material that is in contact with the adhesive 30 which is in contact with the top surface 22 of the fastener 10 (shown in FIG. 1), and one of the functional layers is a conductive material.

In various embodiments, the dielectric material is a ceramic, a thermosetting material, or a thermoplastic material that can be filled with organic or inert particulate or fiber fillers. The thermosetting material may be an epoxy composite or an elastomer. Elastomer embodiments include polysulfide-based polymeric material and polythioether-based polymeric material. In a specific embodiment, the polysulfide-based material has a backbone structure containing a $-(CH_2CH_2-O-CH_2-O-CH_2CH_2)-$ functionality where C, H, and O represent the presence of carbon, hydrogen, and oxygen atoms, respectively. In an alternative embodiment, the thermosetting material is formulated so that the material is extrudable and/or injectable.

The above described configurations for insert 50 all include dielectric properties and provide a certain amount of protection against lightning strikes when properly fabricated and installed.

Figure 7:
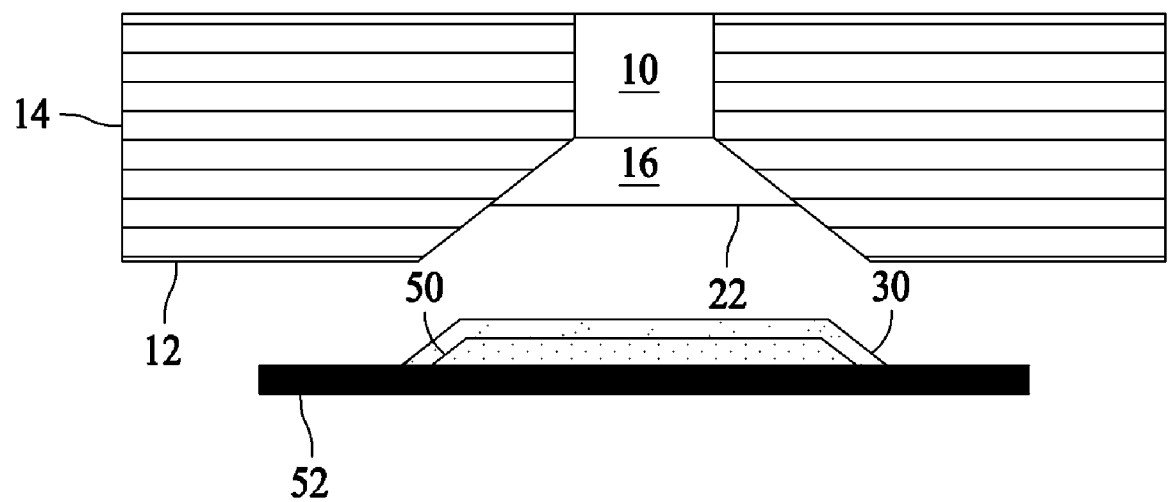
FIG. 7 is a side view of a layer of adhesive deposited on exposed surfaces of a preformed dielectric insert.

FIG. 7 is a side view illustrating an embodiment where adhesive 30 has been deposited on exposed surfaces of a preformed dielectric insert 50 configured to engage an item 14 being fastened. FIG. 7 illustrates that it is not always feasible to coat the top surface 22 of the fastener 10. This is particularly true when installing inserts 50 on an underside of a device, for example, the underside of an aircraft wing or when the viscosity of the adhesive is too thin for application to the top surface 22 when it is oriented in an upside down configuration as shown in FIG. 7. Additionally, uncured sealant may be placed on an insert 50 and the combination of the two frozen until the insert 50 is to be used. Of course, the installation represented in FIG. 7 is applicable to embodiments of insert 50 that do not incorporate the backing material 52 and the thickness of the adhesive 30 depends on the adhesive type and the composition of the dielectric inserts 50 being utilized.

The insert 50 of FIG. 7 is adhered to both the fastener head and walls of the recess with the above described adhesive. Prior to installation, insert 50 can be inspected for structural inconsistencies and dimensional requirements prior to installation, or alternatively (and additionally), prior to shipment from a supplier.

As can be discerned from the above description, inserts 50 are fabricated to conform to the shape of a recess prior to installation due to their complementary shape. In various embodiments, these inserts are configured with an outer surface, with reference to an installed insert, that has a specific contour, tailored to provide aerodynamic advantages.

Figure 8:
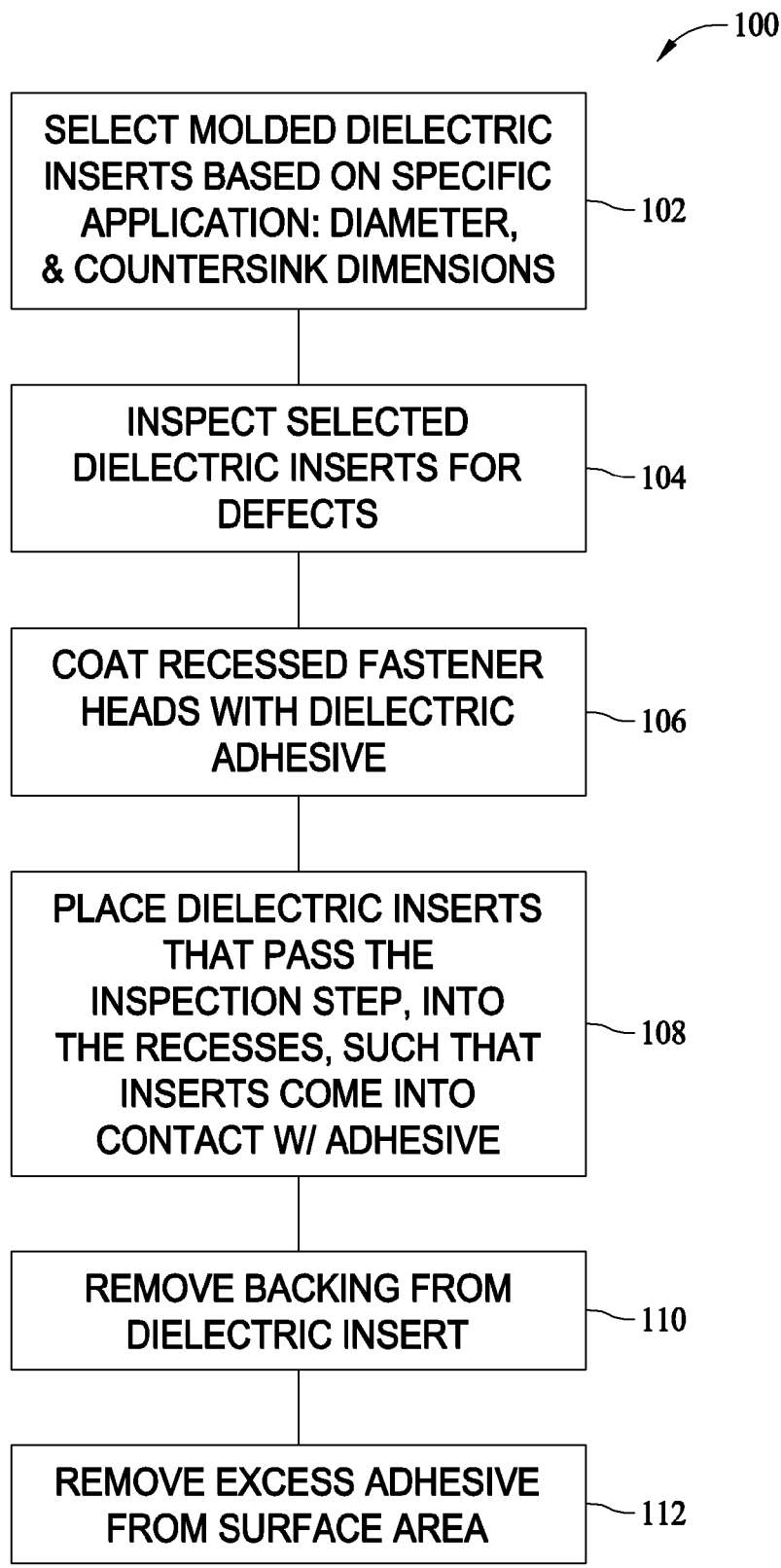
FIG. 8 is a flowchart illustrating a method associated with the utilization of preformed dielectric inserts.

FIG. 8 is a flowchart 100 illustrating a method associated with the utilization of the above described preformed dielectric inserts. Referring specifically to flowchart 100, molded dielectric inserts are selected 102 based on the specific application, for example, based on at least one of diameter, and countersink dimensions such as depth and an angle associated with the recess where the fastener is located. The selected dielectric inserts may then be inspected 104 for structural inconsistencies. It should be noted that an inspection process for the dielectric inserts is likely also implemented as part of the insert fabrication process. The acceptable dielectric inserts, those that pass the inspection process, are set aside. The fastener head or the applicable portion of the insert is then coated 106 with a dielectric adhesive.

Dielectric inserts that have passed the inspection process are placed 108 into the recesses such that adhesive is in contact with both the fastener and the insert. In an embodiment, pressure is applied to the dielectric insert, through the backing material or directly, so that an amount of adhesive is squeezed out of the recess, thereby insuring that adhesive is also in contact with side walls (e.g., the complimentary surface of the dielectric insert. The optional backing material, which in an embodiment described above is color coded, is removed 110 from the dielectric inserts and any excess adhesive that is around the top surface of the dielectric insert and/or the surface area of part (e.g., aircraft wing) being fabricated is removed 112.

Figure 9:
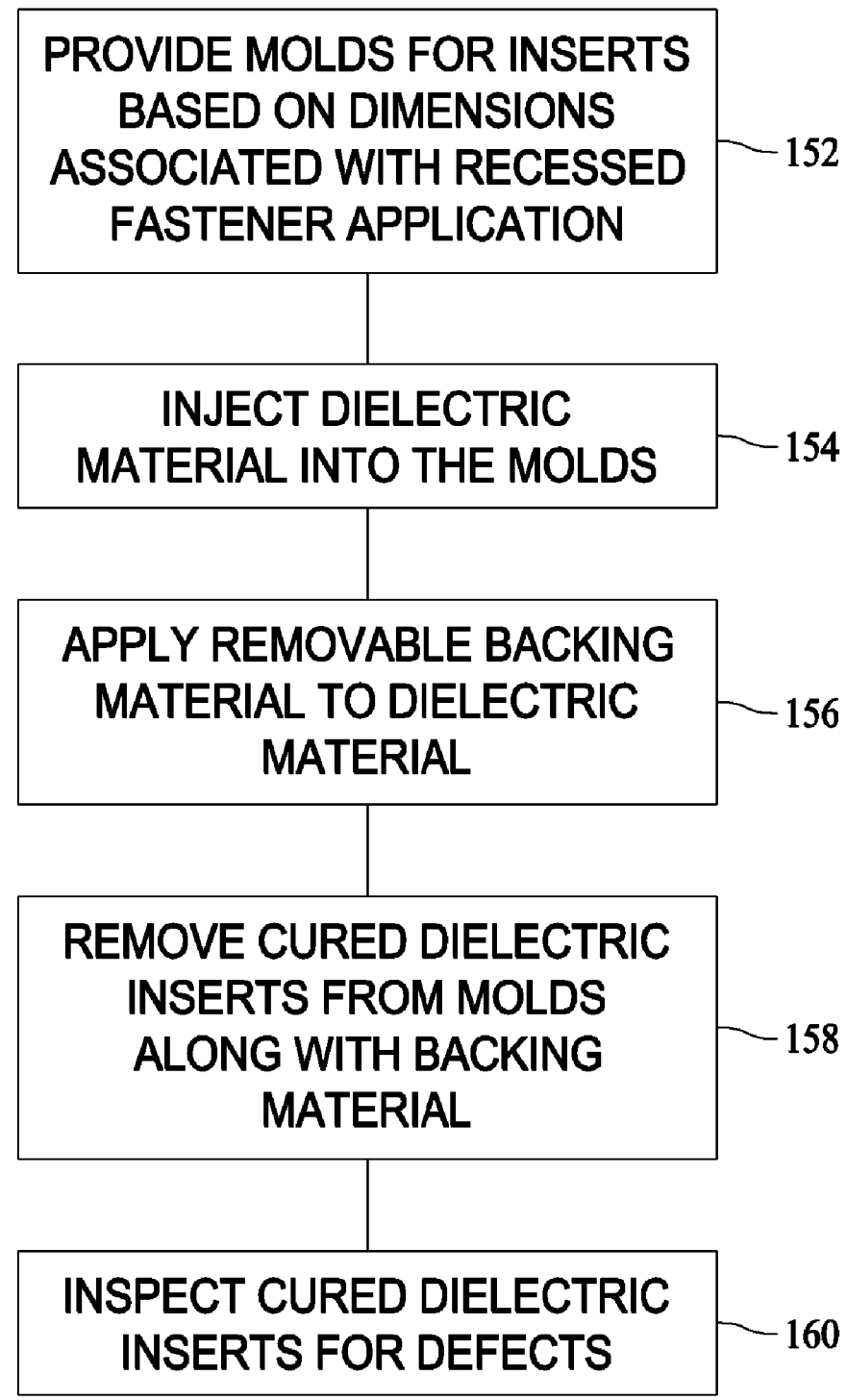
FIG. 9 is a flowchart describing fabrication of dielectric inserts.

Fabrication of the dielectric inserts is also contemplated. FIG. 9 is a flowchart 150 describing fabrication of the dielectric inserts described above. Referring to flowchart 150, various molds with specific countersink depths, diameters, and angled walls are provided 152, consistent with the various recessed fasteners utilized in a fabrication application. The examples utilized above, include aircraft fuselage and wing fabrication, but the embodiments described herein are not limited to the listed applications. Once the molds are provided 152, a dielectric is injected 154 into the molds and optionally a removable backing material, color coded in one embodiment, is applied 156 to the dielectric inserts. Backing material is typically applied before or after the curing process insert so as not to interfere with the curing process. In specific embodiment, backing material is typically placed in the mold and brought into contact with the dielectric material during the injection process. Alternatively, the backing material is applied after the insert is removed from the mold, so as not to interfere with the curing process.

Once cured, the dielectric inserts are removed 158 from the mold, along with the attached backing material (applied before or after curing) and inspected 160 for structural inconsistencies, for example, any pinholes that might occur as a result of the curing process. Particularly, preformed single functional layer inserts are fabricated in a two-faced mold with cavities conforming to a shape of a recess associated with a fastener. In a particular application, the cavity conforms to the shape of the recess as the cavity is machined out of one of the two sides of the mold. In one embodiment of mold, the side of the mold coinciding with the top surface of the insert 50 is machined to produce a specific contour that has been tailored to provide an aerodynamic advantage, for example, the contour is consistent with a contour of the area surrounding the recess into which the insert 50 is to be placed.

In alternative embodiments, the mold is fabricated out of Teflon, PTFE, other fluorinated polymeric materials, the mold is fabricated out of non-fluorinated polymeric materials, or the mold is fabricated utilizing one or more metals that have been subsequently sprayed or coated with a release agent.

In the thermosetting material embodiment, the material is injected into the mold and allowed to cure in the mold until dimensionally stable, then the release film or removable backing material is applied, the release film being chosen so that the sealant being utilized does not permanently adhere to the release film.

In the various embodiments described herein, the installation of preformed dielectric inserts replaces installation of an uncured dielectric material to improve lightning strike protection by providing uniformity in their formation. A higher confidence will result in users and inspectors, based on the inspection of all surface areas of the inserts, which is difficult and time consuming with inserts that are cured in the recess they are intended to fill. While this higher confidence may result due to an assumption that no structural inconsistencies present on any of the surfaces likely indicates that there are no inconsistencies in the interior of the insert, X-ray inspection may also be utilized. X-ray inspection, which cannot be utilized in the present seal cure and shave process, or other inspection processes helps to ensure no voids are present, resulting in an even more effective lightning strike protection system. In a particular application, alluded to several times herein, the dielectric inserts are used by airplane producers seeking to use it as a part of a lightning strike protection system in primary composite structures, and airlines using the insert in maintenance operations.

The following once again compares the current method associated with lightning strike protection and the embodiments described herein. In the current practice, an application, cure and shave process is utilized in assembly which is laborious, messy, time consuming, and waste generating. The embodiments herein describe a preformed dielectric insert that is fabricated prior to assembly, possibly by a supplier, which is installed into an assembly, and any excess adhesive is simply wiped off. The current process also dictates cold storage of uncured sealant and/or on site mixing processes as opposed to ambient on site storage of preformed dielectric inserts. Therefore, the current method often requires a sealant thawing step before it can be applied onto the recessed fasteners. Further, as the current method is performed by persons, there is a variation in the formation of the top surface of the cured in place dielectric material, as opposed to a possible automated formation of the dielectric inserts described herein.

There are no labeling requirements with the current method, however, with the described embodiments, labeling is likely to be utilized, although labeling might be accomplished through the use of different colored backing materials and/or different colored dielectric inserts, to identify various dimensions and/or depths associated with a dielectric insert. Trimming and/or adjustment is likely, for cured in place dielectric materials used in the current processes. Preformed dielectric inserts may also require some trimming, for example, to compensate for any irregularities in recessed fastener hole dimensions. However, trimming of the inserts is less likely to affect the surrounding material as the trimming may be done before the insert is installed.

There is a non-destructive inspection for structural inconsistencies under the current apply, cure, and shave process, however, it is limited to the upper surface of the dielectric material. With a preformed dielectric insert, the non-destructive inspection process can be performed on all surfaces before it is inserted into the fastener recess. When surface inconsistencies are found on an insert that is cured in place, a repair process must be conducted, typically involved removal of cured material, whereas in the described embodiments, a preformed dielectric insert that is less than desired may be discarded prior to delivery or installation, reducing repair time.

The existing methods generate a large amount of waste sealant due to the shaving operation. In addition, there may be a problem meeting aerodynamic dimensional tolerances due to sealant shrinkage following installation. The dielectric application, cure, and shave process also is an integral step in the assembly process, rather than prior to or concurrent with the assembly process resulting in more labor, time, and interference with other assembly process steps as a heat source may be utilized in curing. Further, there has been a propensity for effecting surrounding structure during the shaving operation.

In summary, the described embodiments provide an improvement over existing lightning strike protective measures because there is a complete surface inspection of the dielectric inserts for inconsistencies. Additionally, the dielectric inserts are formed prior to installation and therefore any less than ideal inserts can be discarded prior to delivery. Another improvement is that no metal blades touch composite materials (airframe surface damage control), and a separate dielectric insert fabrication step lends itself to automation, thereby eliminating human variability. Waste is reduced (material costs), it is easier to meet aerodynamic dimensional tolerances, and a cure time and/or temperature is reduced as compared to existing methods (curing is eliminated in the production environment).

The described embodiments reduce installation and inspection time, waste, chances of damaging the composite, and increase precision in meeting dimensional tolerances to provide better lightning strike protection. Users have better uniformity while the suppliers have new value added products in their inventory. Cost savings that are believed to result from the application of the herein described embodiments include flow savings (less time to install), cost avoidance associated with the price of material (minimize material usage/waste), labor savings (less people to certify to perform the sealing task), and rework time savings (no need for additional heat cure/ambient cure of less than ideal tops). Additionally, repair by users will be faster than with the current method as less time is needed for re-installation.

While the invention has been described in terms of various specific embodiments, those skilled in the art will recognize that the invention can be practiced with modification within the spirit and scope of the claims.

What is claimed is:

1. A structure comprising:
    a first mechanical member comprising a surface having at least one bore therein;
    at least one fastener configured to attach said first mechanical member to a second mechanical member, said fastener configured for insertion into the bore, an area between a top surface of the fastener and said surface of said first mechanical member defining a recess with walls;
    a preformed insert having substantially complimentary shapes to the recess, said insert comprising a dielectric material free of voids; and
    an adhesive, said adhesive applied to at least one of the fastener and the preformed insert, said preformed insert inserted into the recess such that said adhesive is dispersed between said insert and the recess walls and engages the recess walls, said at least one fastener and the insert, essentially burying said at least one fastener under said dielectric material such that any disparities between said insert and the recess wall are filled in, thereby protecting said at least one fastener from lightning strikes.

2. A structure according to claim 1 wherein said adhesive comprises at least one of a thermoset, a thermoplastic elastomer, and a pressure sensitive adhesive.

3. A structure according to claim 1 wherein said preformed insert comprises at least one dielectric material in contact with the top surface of the fastener.

4. A structure according to claim 1 wherein said preformed insert comprises a plurality of layers, at least one layer of dielectric material and at least one other layer that has a different conductivity than at least one layer of dielectric material.

5. A structure according to claim 1 wherein said preformed insert comprises at least one of a ceramic, a thermosetting material, and a thermoplastic material.

6. A structure according to claim 1 wherein said preformed insert comprises a surface having a contour such that upon installation, said insert and a surface area surrounding the recess into which said insert is installed are substantially smooth.

7. A structure according to claim 1 wherein said first mechanical member is an aircraft wing, said second mechanical member is a fuel tank, and said at least one fastener extends into said fuel tank.

* * * * *